March 23, 1954  H. S. CAMPBELL  2,672,939
ROTOR-EQUIPPED AIRCRAFT
Filed July 30, 1946  4 Sheets-Sheet 1

INVENTOR
Harris S. Campbell
BY
ATTORNEYS

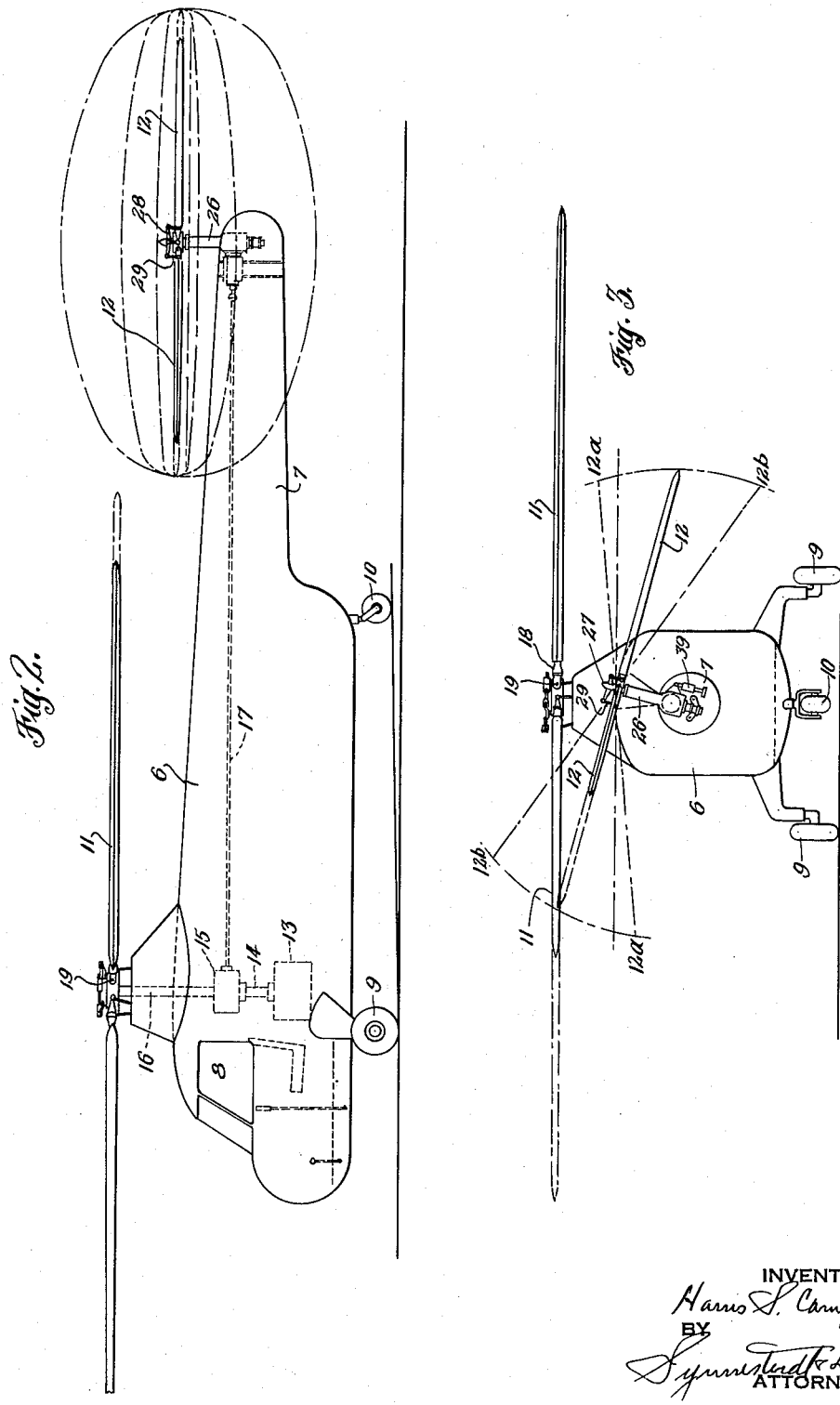

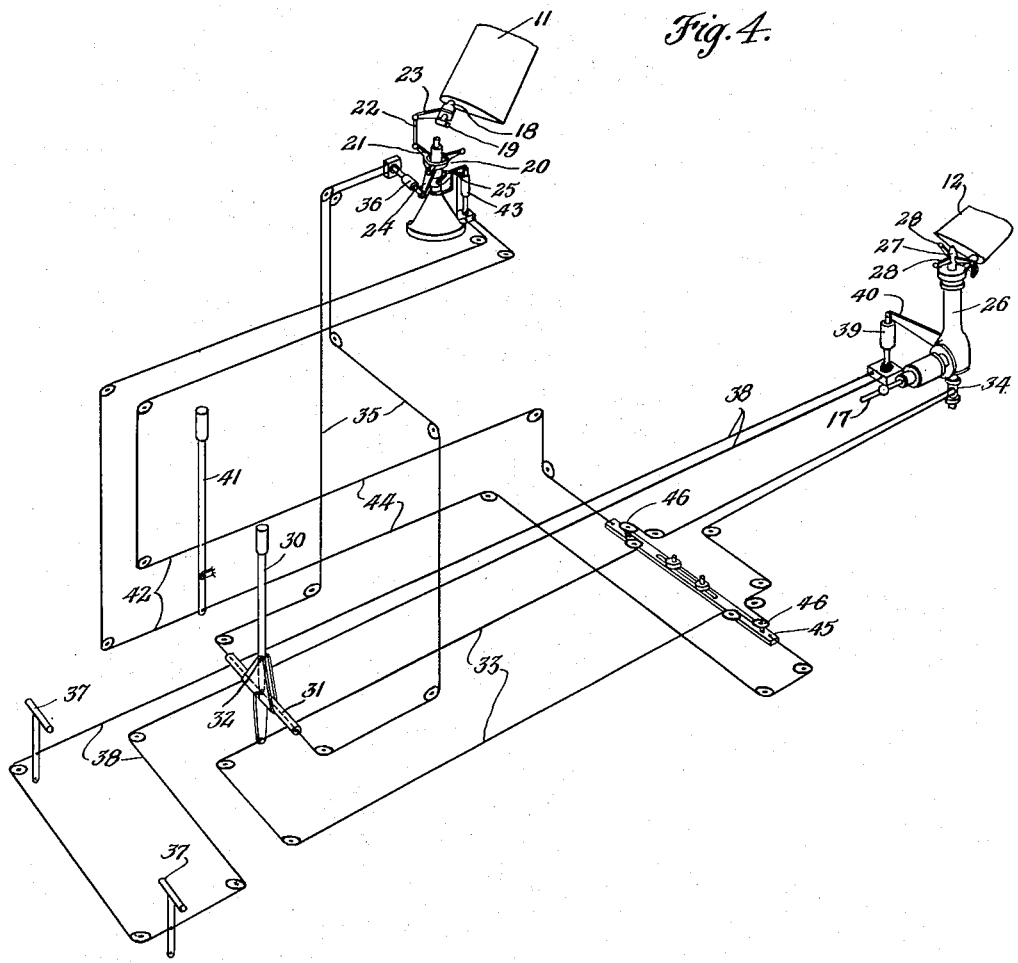

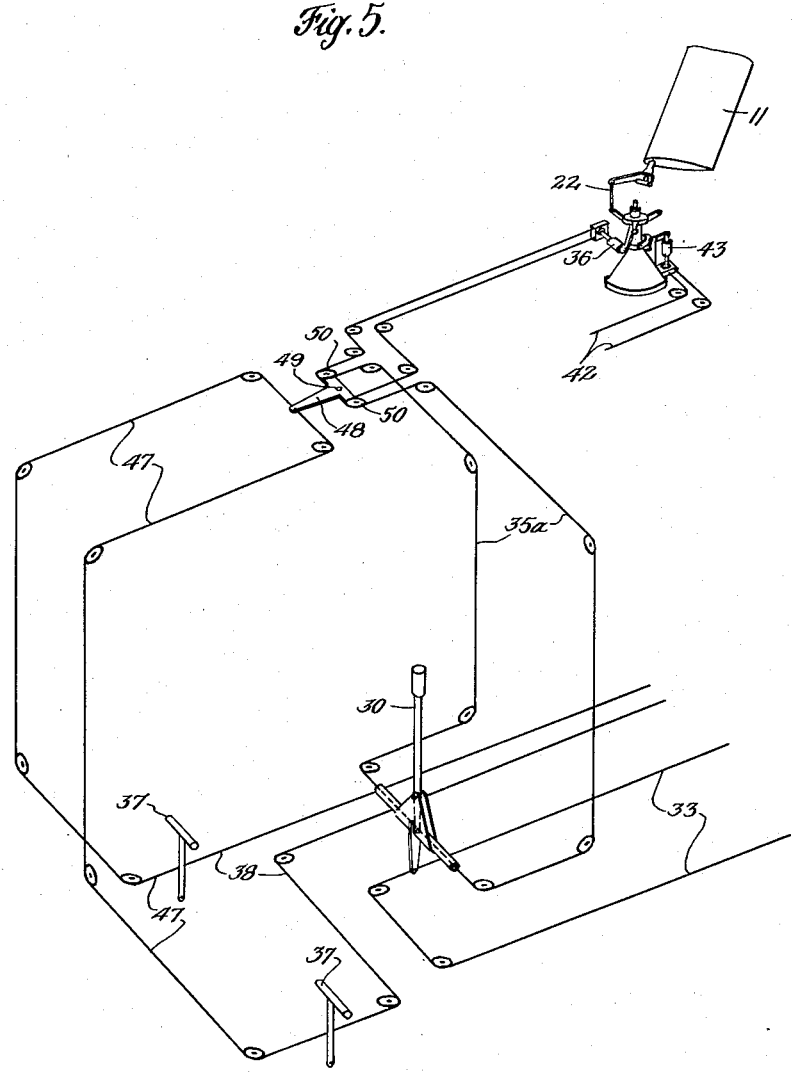

Patented Mar. 23, 1954

2,672,939

UNITED STATES PATENT OFFICE 2,672,939

ROTOR-EQUIPPED AIRCRAFT

Harris S. Campbell, Bryn Athyn, Pa., assignor to Autogiro Company of America, Philadelphia, Pa., a corporation of Delaware Application July 30, 1946, Serial No. 687,116

7 Claims. (Cl. 170—135.22)

This invention relates to rotative winged aircraft and is particularly concerned with a novel rotor and rotor control arrangement for such aircraft.

Although various features of the invention are of utility as applied to rotary winged aircraft of a variety of types, the invention is especially concerned with an aircraft having a single primary sustaining rotor adapted to be hub driven during flight; and in this connection one of the primary objects of the invention is the provision of a supplemental rotor arranged to compensate for the counter-torque incident to drive of the main rotor and at the same time to contribute a minor portion of the sustention required for the aircraft.

Another object of the invention is the simplification of controls and the utilization of a supplemental tail rotor of the type above mentioned to effect control in yaw in a novel manner.

The foregoing and also other objects and advantages can best be comprehended after a consideration of a specific embodiment of the invention and for this purpose reference is now made to the accompanying drawings in which—

Figure 2 is a side outline view of the aircraft of Figure 1;

Figure 3 is a rear end elevation of the aircrafts of Figures 1 and 2;

Figure 4 is a schematic view of a control system contemplated for use in the aircraft of Figures 1 to 3; and Figure 5 is a view similar to Figure 4 but illustrating a modified form of control system.

Figure 1:
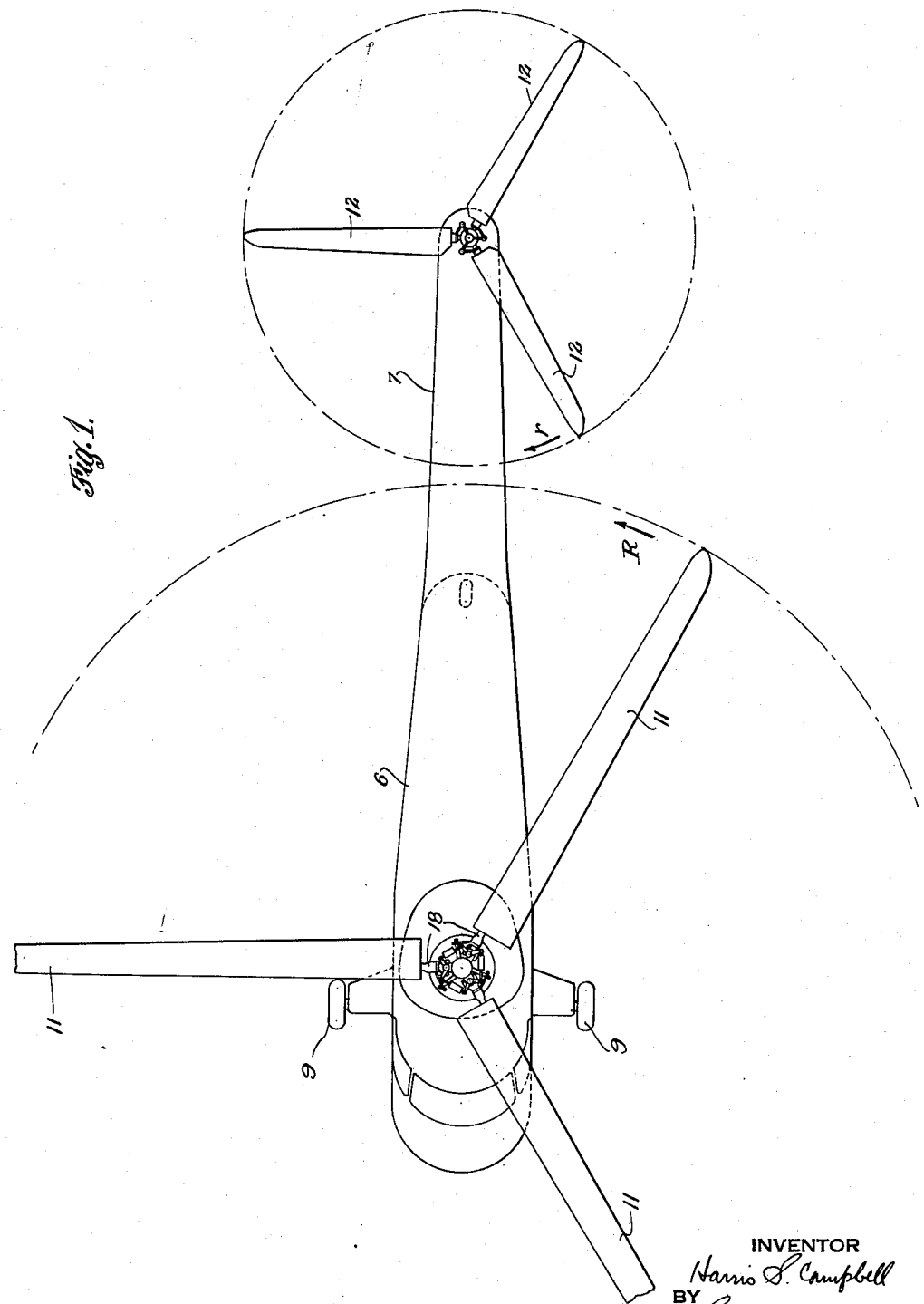
Figure 1 is a plan outline view of an aircraft according to the invention.

Referring first to Figures 1, 2 and 3, it is noted that the aircraft as shown comprises a body 6 having a rear extension 7. An occupant's compartment is provided in the forward end as at 8. Any suitable landing gear may be employed such as the wheels indicated at 9—9 and 10.

The aircraft is provided with a single primary sustaining rotor incorporating blades 11 oriented to rotate in the direction indicated by the arrow R. This rotor is adapted to contribute the major portion of the sustention for the aircraft and is mounted well forwardly on the body.

A second and supplemental rotor is provided incorporating blades 12, these blades being oriented to rotate, as indicated by the arrow r, in a direction opposite to the direction of rotation of the main rotor. The supplemental rotor is of relatively small diameter, preferably less than about 60% of the diameter of the main rotor, and is adapted to contribute only a minor fraction, preferably less than about 25% of the total sustention for the aircraft. The supplemental rotor is mounted at the rear of the machine adjacent the rear end of the body extension 7.

Both rotors are adapted to be driven from an engine diagrammatically indicated at 13. The power delivery shaft 14 of the engine is connected with the transmission unit 15 from which the rotor drive shafts 16 and 17 extend, the former upwardly to the main rotor and the latter rearwardly to the rear rotor. The transmission unit 15 advantageously incorporates gearing serving to interconnect shafts 16 and 17 and serving also to connect these shafts with the power shaft 14. Preferably both a manually controllable and a free wheeling or overrunning clutch are incorporated in the transmission unit between shaft 14 and the interconnected shafts 16 and 17. The details of such transmission mechanism need not be considered herein since they form no part of the present invention per se and are well understood in this art. It may be mentioned, however, that in the event of engine failure it is contemplated that at least the main rotor be capable of autorotative actuation, in which event the arrangement of the transmission as above will ensure continuance of rotation of the tail rotor in order to effect a safe descent of the aircraft under full control.

The blades 11 of the main rotor are connected with an autorotative hub part by means of pitch change mountings 18 providing for pitch change movement substantially about the longitudinal axes of the individual blades; and preferably also by means of flapping pivots such as indicated at 19. A lag-lead or drag pivot for each blade may also be incorporated. It may be mentioned that in Figure 4 a portion of the hub has been broken out to avoid confusion in illustration of certain elements of the control system. The details of the blade mountings need not be considered herein since they are well understood and form no part of the present invention per se. It may be mentioned, however, that an appropriate pivotal mounting for the individual blades, incorporating pitch change, flapping and drag pivots is disclosed in my copending application Serial No. 605,577, filed July 17, 1945, now Patent No. 2,580,514.

In the arrangement illustrated, the blades of the main rotor are further capable of controlled regulation of pitch angle, both cyclically and as to mean pitch setting. For this purpose a vertically movable and angularly tiltable swash member 20 is provided, the swash member being equipped with radially projecting arms 21 which are adapted to be coupled by means of links 22 with arms 23 which are connected with the blades. This general type of pitch control linkage is also well known (being shown, for example, in the copending application referred to above), but it is here pointed out that vertical movement of the swash member causes the pitch of all the blades of the rotor to increase or decrease in the same sense; whereas lateral tilting movement of the swash member introduces a cyclic pitch variation, each blade undergoing a periodic increase and decrease of pitch angle synchronously with rotation of the rotor.

The rotative swash member 20 is mounted on a nonrotative part with which the control connections are associated, the control for lateral tilting of the swash member being indicated at 24 in Figure 4, and the control for vertical movement of the swash member being indicated at 25.

The rear rotor (incorporating blades 12) is carried by a laterally tiltable mount 26. The blades of this rear rotor may also be flappingly articulated to the rotative hub part and, if desired, the blade mounting may further incorporate a drag pivot for each blade. These blades are also provided with pitch change mountings and the mean pitch of the blades 12 of the rear rotor is adapted to be controlled by the vertically movable rod 27 having arms 28 projecting therefrom adapted to be coupled by means of links 29 with the blades so that upon vertical movement of the rod 27 the pitch of all of the blades is increased or decreased.

Pitch control of both rotors and tilting control of the rear rotor is effected by means of screw jack devices such as those described hereinbelow in connection with the control system illustrated in Figure 4.

As shown in Figure 4 the control system incorporates a pilot operable control organ such as the conventional control stick 30 which is mounted for fore and aft movement about the axis of a support 31 and which is further mounted for lateral movement about a pivot 32. As viewed in Figure 4, the forward direction is to the left of the figure.

A cable system 33 is associated with the control stick 30 so that upon fore and aft movement of the control stick the cable system 33 actuates the screw jack device 34 for the mean pitch control of the tail rotor. The sense of this hook-up is such that forward movement of the control stick 30 increases the mean pitch of the blades of the rear rotor and thereby causes a nose-down moment. Conversely, rearward movement of the control stick 30 decreases the mean pitch of the blades of the rear rotor thereby causing a nose-up moment.

A second cable system 35 is associated with the control stick in a manner providing for actuation of this cable system when the control stick is moved laterally. Cable system 35 extends to the screw jack device 36 which is coupled with the cyclic pitch control arm 24 for the front rotor, thereby causing tilting movement of the swash member 20 and introducing a cyclic pitch variation in the forward rotor. The sense of this cyclic pitch variation is such as to laterally tilt the blade tip path and thus also the lift vector of the forward rotor, so as to introduce rolling moments to one side or the other. It may be mentioned that in a rotor in which the blades are flappingly pivoted, a lateral inclination of the blade tip path and of the lift vector is attained by a cycle pitch variation providing for maximum increase and maximum decrease in pitch of the blades as they pass at the front and at the rear of the rotor. Thus with the main rotor turning in the direction indicated in Figure 1, the control system should be coupled so that lateral movement of the control stick 30 to the left causes the blades to experience maximum pitch decrease as they pass at the front of the machine and maximum pitch increase as they pass at the rear. This will result in the instinctive banking moment to the left. Correspondingly, movement of the control stick to the right causes the blades to attain maximum pitch increase at the front and maximum pitch decrease at the rear, thereby introducing a rolling moment to the right, i. e., in the instinctive sense.

The control system of Figure 4 further includes a steering control here shown in the form of a pair of steering pedals 37—37 with which a cable system 38 is associated, this cable system being extended to the screw jack device 39 which is associated with a lateral arm 40 projecting from the tiltable mount 26 for the rear rotor. Actuation of the steering pedals 37 thus effects tilting of the rear rotor as a unit in a transverse plane, for instance, through the range indicated by the dot-and-dash lines 12a and 12b applied to Figure 3. The hook-up of this control is also advantageously made in the conventional aircraft sense, i. e., such that forward movement of the left hand steering pedal 37 will cause the rear rotor to tilt laterally toward the right, and forward movement of the right hand steering pedal 37 will cause tilting movement of the rear rotor in the opposite sense. This effects control in yaw by variation of the horizontal or lateral component of the thrust vector of the rear rotor.

In Figure 3 the blades 12 of the rear rotor are shown in full lines in positions intermediate the limits of lateral tilting movement and it will be noted that the full line position is at an appreciably inclined angle with respect to the mean plane of rotation of the front rotor. It is contemplated that this laterally inclined position shall correspond to a mid position of adjustment of the steering pedals 37—37, the purpose being to establish, as a mid position of control, a condition in which the rear rotor normally imparts a yawing moment to the body in a sense to compensate for the counter-torque incident to the hub drive of the main rotor. In this way in normal operation, i. e., when the main rotor is hub driven in the normal range of flight R. P. M., a range of yaw control is provided toward either side of the mid position.

With further reference to the balancing or compensation for the counter-torque of the main rotor, it is noted that according to the invention the rear rotor is preferably driven in a direction opposite to that of the main rotor. This will, in part, automatically compensate for a portion of the counter-torque incident to drive of the main rotor, but since it is contemplated that the main rotor shall contribute the major portion of the sustention, the main rotor is, of course, of much greater size than the rear rotor and drive of the two rotors in opposite senses will not result in full equalization of the torques of the two rotors.

The control system shown in Figure 4 still further incorporates a pitch control lever 41 with which a cable system 42 is associated, this cable system being extended to the screw jack device 43 for the main rotor, the device 43 being associated with the main pitch control lever 25 by means of which the swash member 20 is moved vertically, thus causing the mean pitch of all of the blades of the main rotor to increase or decrease. A cable system 44 is also associated with the lever 41 and is connected with a laterally slidable bar 45 carrying pulleys 46 which are associated with the cable system 33 in such a way that lateral sliding movement of the bar 45 in one direction shortens one run of the cable system 33 and correspondingly lengthens the other run. Actuation of the pitch control lever 41 thus also adjusts the mean pitch of the rear rotor, the effect of this adjustment being superimposed upon that of fore and aft movement of the primary control stick 30. The sense of hook-up of the cable systems 42 and 44 with the control lever 41 is such that movement of the control stick 41 in one direction causes the mean pitch of both rotors to increase, and movement of the control stick in the opposite direction causes the mean pitch of both rotors to decrease. This control is employed in effecting vertical ascent or vertical descent.

With reference to the mean pitch control described just above, it is mentioned that preferably the range of pitch adjustment of both rotors is such as to include a value appropriate for aerodynamic or autorotative operation of the rotors. Thus, in the event of engine failure the pitch of both rotors may be decreased to a suitable autorotative value, whereupon the rotors will continue in operation, to effect a safe descent. It is further mentioned in this connection that the gearing of the rear rotor to the main rotor will ensure continued rotation of the rear rotor even in the event of adjustment of the primary control stick 30 in a sense to cause pitch increase of the rear rotor blades 12 above an effective autorotational value. In this case the autorotation of the main rotor serves to drive the rear rotor.

With still further reference to autorotative operation, it is noted that the range of lateral tilting adjustment of the rear rotor is such as to include blade positions 12a—12a in which the lift vector of the rear rotor is inclined upwardly and to the left when viewed as in Figure 3. This will enable steering the aircraft to the right as well as to the left under autorotative conditions, thereby ensuring maintenance of directional control of the aircraft notwithstanding power failure.

It may here be noted that while cyclic pitch variation of the blades of the rear rotor may be employed in order to effect lateral tilt of the blade tip path, it is of advantage to employ a tiltable mounting such as indicated at 26, since this avoids the complications which would be necessary by introducing cyclic pitch control mechanism in the rear rotor such as a swash member.

The control system of Figure 5 is similar to that of Figure 4. In the illustration of Figure 5, however, certain parts shown in Figure 4 have been omitted, including the simultaneous pitch control lever 41 and portions of the associated control systems and including also the rear rotor. The difference between the systems of Figure 4 and Figure 5 lies in the provision of an additional cable system 47 associated with the steering pedals 37, this cable system being extended to one arm of a double bellcrank 48 which is pivoted at 49 and which carries pulleys 50—50 which are associated with the opposed runs of the cable system 35a which is actuable by lateral movement of the control stick 30. In this arrangement actuation of the steering pedals 37 not only effects lateral tilting of the blade tip path of the rear rotor but also introduces cyclic pitch variation in the main rotor so as to effect lateral tilt of the blade tip path of the main rotor. The sense of this hook-up is such as to provide for lateral tilt of the blade tip paths of the two rotors in opposite senses which may be employed to advantage under certain conditions, for instance, in hovering flight when it is desired to turn the machine about a vertical axis. The adjustment introduced through the cable system 47 is superimposed upon that derived from lateral movement of the control stick 30.

I claim:

1. An aircraft comprising a body, a bladed sustaining rotor located well forwardly on the body and comprising the principal means of sustaining the aircraft in flight, mechanism providing for lateral tilt of the blade tip path of said rotor, a second bladed sustaining rotor located well rearwardly on the body and of considerably smaller diameter than the first rotor, power means for driving the rotors including power transmission mechanism operative to transmit torque to the rotors by reaction against the aircraft body, a tiltable mount for the second rotor providing for lateral tilt thereof as a whole to provide for control of the aircraft in yaw, and flight control mechanism for the aircraft comprising a pilot operable control organ movable in fore-and-aft and lateral planes, connections between said control organ and said first mechanism providing for lateral tilt of the blade tip path of the first rotor upon movement of said control organ in the lateral plane, mechanism providing for variation of the mean pitch of the second rotor, connections between said control organ and the mechanism for varying the mean pitch of the second rotor providing for varying the mean pitch of the second rotor upon movement of the control organ in the fore-and-aft plane, and a foot operable pilot's yaw control, with connections extended therefrom to said tiltable mount, the yaw control having a mid position for straight-away translational flight and said connections being arranged to establish a laterally inclined position of the second rotor when the yaw control occupies its mid position.

2. A rotary wing aircraft having a body, a main forwardly located sustaining rotor, a secondary rearwardly located sustaining rotor having approximately one-half the diameter of the first rotor, a foot operated pilot control connected to said secondary rotor and adapted to cause lateral bodily tilting thereof independently of the blade tip path of the main rotor, and a pilot control operative independently of said foot operated control and connected to said main rotor for laterally tilting the blade tip path thereof independently of the position of the secondary rotor.

3. A rotary wing aircraft having a body, a main forwardly located bladed sustaining rotor, a secondary rearwardly located bladed sustaining rotor of diameter less than 60% of the diameter of the first rotor, a pilot operable control connected to said secondary rotor and adapted to cause lateral bodily tilting thereof independently of the blade tip path of the main rotor, and a second foot operated control operative independently of said first control and connected to said main rotor for laterally tilting the blade tip path thereof independently of the position of the secondary rotor.

4. A construction in accordance with claim 3 in which the second pilot operated control is operative to effect cyclic blade pitch variation and thereby provide for variable lateral tilting of the blade tip path of said main rotor.

5. A construction in accordance with claim 3 in which said second pilot operable control is movable in two planes, movement in one such plane providing for lateral tilting of the blade tip path of the main rotor, and movement in the other plane providing for variation of mean blade pitch angle of said secondary rotor.

6. A construction in accordance with claim 5 and further comprising a control organ for concurrently and similarly varying the mean rotor blade pitch angle of both rotors independently of the operation of the other pilot operated controls.

7. A rotary wing aircraft having a body, a main forwardly located bladed sustaining rotor, a secondary rearwardly located bladed sustaining rotor of considerably smaller diameter than the diameter of the first rotor, mechanism providing for variation of mean rotor blade pitch angle of said secondary rotor, mechanism providing for lateral bodily tilting of said secondary rotor, and a control system comprising a foot operated control organ connected with said secondary rotor for tilting the same laterally of the aircraft independently of the position of the main rotor, and another separately operable pilot control organ connected with the blades of the secondary rotor and providing for variation of the mean rotor blade pitch angle of said secondary rotor independently of the mean rotor blade pitch angle of the main rotor.

HARRIS S. CAMPBELL.

References Cited in the file of this patent

UNITED STATES PATENTS

| Number | Name | Date |
|---|---|---|
| 1,783,011 | Florine | Nov. 25, 1930 |
| 2,130,918 | Stefano | Sept. 20, 1938 |
| 2,233,747 | Riedl | Mar. 4, 1941 |
| 2,273,303 | Waldron | Feb. 17, 1942 |
| 2,318,260 | Sikorsky | May 4, 1943 |
| 2,415,148 | Sikorsky | Feb. 4, 1947 |
| 2,496,624 | Heintze | Feb. 7, 1950 |

FOREIGN PATENTS

| Number | Country | Date |
|---|---|---|
| 155,974 | Switzerland | Oct. 1, 1932 |
| 317,059 | Great Britain | Feb. 9, 1931 |